US011569975B2

(12) United States Patent
Van Ierssel

(10) Patent No.: US 11,569,975 B2
(45) Date of Patent: Jan. 31, 2023

(54) BAUD-RATE CLOCK RECOVERY LOCK POINT CONTROL

(71) Applicant: Rambus Inc., San Jose, CA (US)

(72) Inventor: Marcus Van Ierssel, Toronto (CA)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/333,380

(22) Filed: May 28, 2021

(65) Prior Publication Data

US 2021/0385060 A1 Dec. 9, 2021

Related U.S. Application Data

(60) Provisional application No. 63/036,003, filed on Jun. 8, 2020.

(51) Int. Cl.
*H04L 7/00* (2006.01)
*H04L 7/06* (2006.01)

(52) U.S. Cl.
CPC .......... *H04L 7/0037* (2013.01); *H04L 7/0012* (2013.01); *H04L 7/06* (2013.01)

(58) Field of Classification Search
CPC ....... H04L 7/0037; H04L 7/06; H04L 7/0012; H04B 10/6933
USPC ....... 375/355, 257, 258, 371, 373, 375, 376, 375/325, 326, 327
See application file for complete search history.

(56) References Cited

U.S. PATENT DOCUMENTS 8,934,525 B2 1/2015 Lee et al.
2018/0262373 A1* 9/2018 Shibasaki .......... H04B 10/6933

OTHER PUBLICATIONS

Dokania, Rajeev et al., "A 5.9pJ/b 10Gb/s Serial Link with Unequalized MM-CDR in 14nm Tri-Gate CMOS", ISSCC 2015/Session 10/Advanced Wireline Techniques and PLLs/10.5, IEEE International Solid-State Circuits Conference, 2015, pp. 184-186. 3 Pages.
Yoo, Danny et al., "A 36Gb/s Adaptive Baud-Rate CDR with CTLE and 1-Tap DFE in 28nm CMOS", ISSCC 2019/Session 6/Ultra-High-Speed Wireline/6.8, IEEE International Solid-States Circuits Conference, 2019, pp. 126-128. 3 Pages.

* cited by examiner

*Primary Examiner* — Phuong Phu
(74) *Attorney, Agent, or Firm* — The Neudeck Law Firm, LLC

(57) ABSTRACT

A baud-rate phase detector uses two error samplers. One error sampler is used to determine whether the sampling time is too early error detection. The other is used to determine whether sampling time is too late. The early error sampler is configured to use a first threshold voltage. The late error sampler is configured to use a second threshold voltage. By adjusting the voltage difference between the first threshold voltage and the second threshold voltage, the phase difference between the local timing reference clock and the transitions of the data signal may be adjusted. The phase difference between the local timing reference clock and the transitions of the data signal may be adjusted to improve or optimize a desired receiver characteristic such as bit error rate or signal eye opening.

18 Claims, 13 Drawing Sheets

GENERATE A FIRST EARLY ERROR SAMPLE VALUE BY COMPARING, AT A FIRST SAMPLING TIME, A DATA SIGNAL TO A FIRST ERROR THRESHOLD VOLTAGE
502

GENERATE A FIRST DATA SAMPLE VALUE BY COMPARING, AT THE FIRST SAMPLING TIME, THE DATA SIGNAL TO AT LEAST A FIRST DATA THRESHOLD VOLTAGE
504

BASED ON THE FIRST EARLY ERROR SAMPLE VALUE AND THE FIRST DATA SAMPLE VALUE, GENERATING A FIRST EARLY ERROR SIGNAL VALUE
506

GENERATE A FIRST LATE ERROR SAMPLE VALUE BY COMPARING, AT A SECOND SAMPLING TIME, THE DATA SIGNAL TO A SECOND ERROR THRESHOLD VOLTAGE, THE SECOND ERROR THRESHOLD VOLTAGE NOT EQUAL TO THE FIRST ERROR THRESHOLD VOLTAGE
508

GENERATE A SECOND DATA SAMPLE VALUE BY COMPARING, AT THE SECOND SAMPLING TIME, THE DATA SIGNAL TO AT LEAST THE FIRST DATA THRESHOLD VOLTAGE
510

BASED ON THE FIRST LATE ERROR SAMPLE VALUE AND THE SECOND DATA SAMPLE VALUE, GENERATING A FIRST LATE ERROR SIGNAL VALUE
512

BASED ON THE FIRST EARLY ERROR SIGNAL VALUE AND THE FIRST LATE ERROR SIGNAL VALUE, ADJUST A PHASE RELATIONSHIP BETWEEN THE DATA SIGNAL AND A TIMING REFERENCE THAT DETERMINED THE FIRST SAMPLING TIME AND THE SECOND SAMPLING TIME.
514

*FIG. 5*

BAUD-RATE CLOCK RECOVERY LOCK POINT CONTROL

BRIEF DESCRIPTION OF THE DRAWINGS

FIG. 5 is a flowchart illustrating a method of phase locking.

DETAILED DESCRIPTION OF THE EMBODIMENTS

An integrated circuit may communicate with another integrated circuit using one or more high-speed serial data streams that are sent without an accompanying clock signal. The receiver of this data stream generates a local timing reference clock from an approximate frequency reference clock by phase-aligning the frequency reference clock (a.k.a., receiver reference clock, or receiver clock) to transitions in the data stream. This process is commonly known as clock and data recovery (CDR).

In an embodiment, certain transitions of the data signals are selected for use in phase-aligning the local clock, and certain transitions are ignored. The selected transitions are based on data patterns and the outputs of two error slicers/samplers. In particular, a transition will be indicated to phase-aligning circuitry as being early based on a first data pattern and the output of an early error sampler that is set to have a first threshold voltage. A transition will be indicated to phase-aligning circuitry as being late based on a second data pattern and the output of a late error sampler that is set to have a second threshold voltage that is not equal to the first threshold.

In an embodiment, by adjusting the voltage difference between the first threshold voltage and the second threshold voltage, the phase difference between the local timing reference clock and the transitions of the data signal may be adjusted. The phase difference between the local timing reference clock and the transitions of the data signal may be adjusted to improve or optimize a desired receiver characteristic such as bit error rate or signal eye opening.

Figure 1:
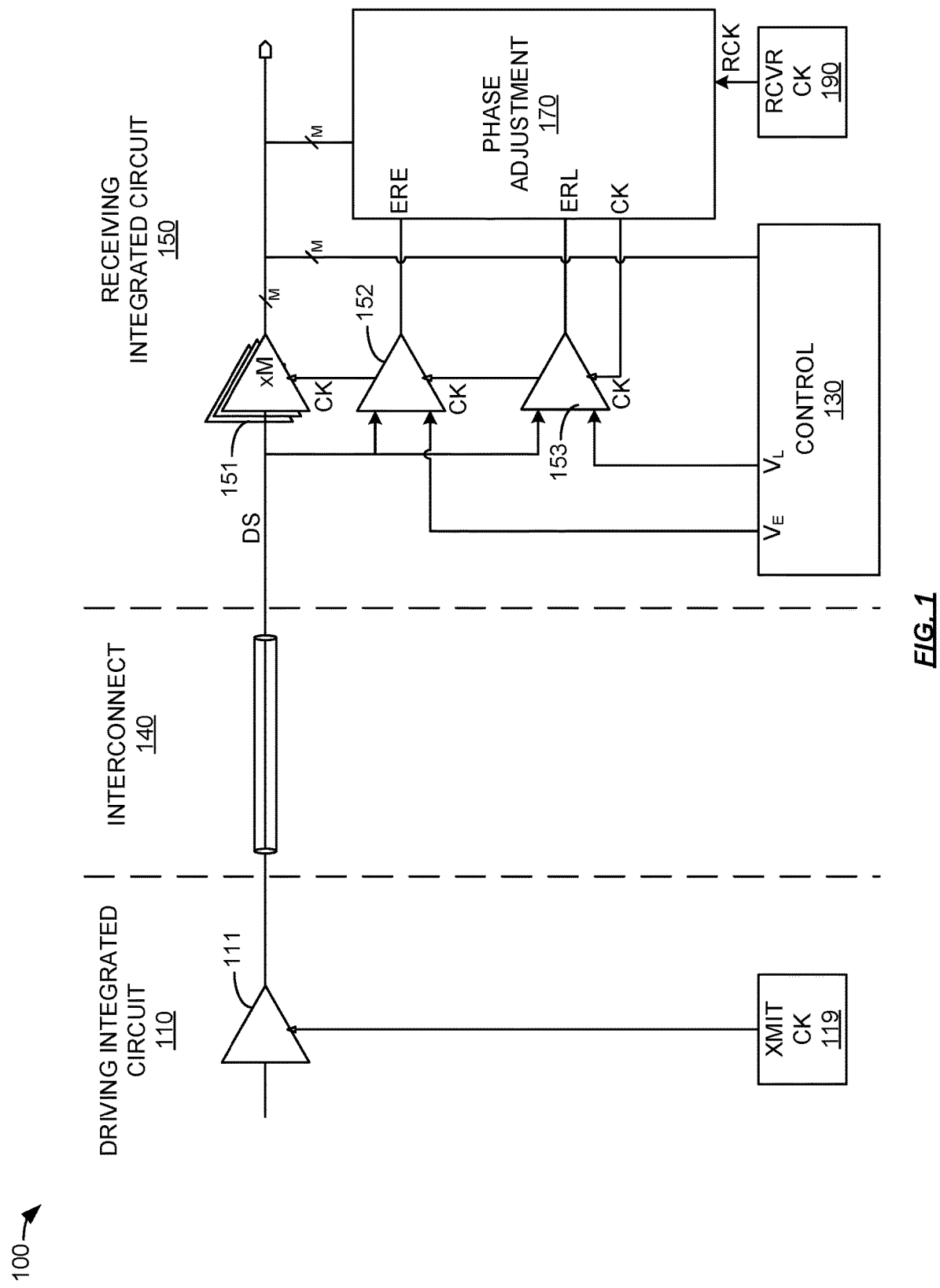
FIG. 1 is a block diagram illustrating an example system.

FIG. 1 is a block diagram illustrating an example system. In FIG. 1, communication system 100 comprises a driving integrated circuit 110, a receiving integrated circuit 150, and interconnect 140 between them. Driving integrated circuit 110 includes transmitter circuit 111 (a.k.a., a driver), and transmit clock source 119. Receiving integrated circuit 150 includes one or more data sampler circuits 151 (a.k.a., data samplers or data slicers), early error sampler 152, late error sampler 153, control circuitry 130, phase adjustment circuit 170, and receiver clock source 190. Interconnect 140 typically comprises a printed circuit (PC) board, connector, cable, flex circuit, other substrate, and/or a combination of these. Interconnect 140 may be and/or include one or more transmission lines. It should also be understood that although system 100 is illustrated as transmitting a single-ended signal, the signals sent by the driving integrated circuit 110 of system 100 may represent a pair of differential signals.

Driving integrated circuit 110 comprises a transmitter circuit 111. Transmitter circuit 111 is operatively coupled to transmit clock source 119 to receive at least one timing reference signal that determines when data received by transmitter circuit 111 from driving integrated circuit 110 is output by transmitter circuit 111.

The output of transmitter circuit 111 is coupled to the data inputs of data samplers 151, the data input of early error sampler 152, and late error sampler 153 via interconnect 140. Data samplers 151 receive a sample clock (CK) from phase adjustment 170. Data samplers 151 sample (or resolve) the voltage level at their data input (i.e., from interconnect 140) against one or more threshold voltages (e.g., PAM-4 compatible threshold voltages of $-\alpha$, 0, and $+\alpha$ for M=3) according to timing provided by sample clock CK. Early error sampler 152 and late error sampler 153 also receive the sample clock CK from phase adjustment 170. Early error sampler 152 samples (or resolves) the voltage level at its data input (i.e., from interconnect 140) against an early threshold voltage, $V_E$, received from control circuitry 130 according to timing provided by sample clock CK. Late error sampler 153 samples (or resolves) the voltage level at its data input (i.e., from interconnect 140) against a late threshold voltage, $V_L$, received from control circuitry 130 according to timing provided by sample clock CK.

The M outputs from data samplers 151 may be decoded to produce N number of received bits. For example, for PAM-4 communication system, three (3) data samplers (i.e., M=3) are used to compare the input voltage to three threshold voltages ($-\alpha$, 0, and $+\alpha$). These three outputs may be decoded to produce a two (2) bit output. This two bit output may be represented by the numbers 3, 1, $-1$, and 3. In another example, for PAM-2 communication system, one (1) data sampler (i.e., M=1) can be used to compare the input voltage to a single threshold voltage (e.g., 0). This output corresponds to a one (1) bit output represented by the numbers 0 and 1.

In other words, for example, in response to one of the edges on CK (e.g., rising edge) a particular data sampler 151 determines whether the voltage at that sampler 151's input is greater than, or less than, a particular threshold (e.g., 1.0V, 0.0V, or $+\alpha$ volts) The output of that sampler corresponds to whether the voltage at the input to that sampler is greater than, or less than, the threshold.

In FIG. 1, there are M number of data samplers 151. Thus, the number of outputs from data samplers 151 is M signals respectively indicating whether the voltage at the inputs of these M data samplers 151 is greater than, or less than, the corresponding M number of threshold voltages. These M signals are provided to phase adjustment 170 and control circuitry 130.

Receiving integrated circuit 150 also includes receiver clock source 190. Receiver clock source 190 is operatively coupled to phase adjustment 170. Phase adjustment 170 receives a clock signal (RCK) from receiver clock source 190. Phase adjustment 170 changes the phase of clock signal RCK to produce phase-adjusted clock signal CK.

Phase adjustment 170 provides a phase-adjusted clock signal CK to data samplers 151, early error sampler 152, and late error sampler 153 of receiving integrated circuit 150. Based on a data pattern comprising the data symbols from three consecutive samples ($d_{-1}$, $d_0$, $d_{+1}$), and an error sample (e.g., $e_{E0}$ from early error sampler 152 or $e_{L0}$ from late error sampler 153) taken at the same time as the middle of the three sampled, phase adjustment 170 adjusts the phase change applied to the clock signal RCK to produce phase-adjusted clock signal CK.

In particular, for example, when the three consecutive samples taken by data samplers 151 are, for PAM-2 signaling, $d_{-1}=0$, $d_0=1$, and $d_{+1}=1$, and the early error sampler 152 sampled $e_{E0}=0$ coincident with the $d_0$ sample, it indicates to phase adjustment 170 that phase-adjusted clock signal CK is too early relative to the data stream (DS) being received. In response, phase adjustment 170 adjusts phase-adjusted clock signal CK to increase the phase difference between the data stream being received and phase-adjusted clock CK. When the three consecutive samples taken by data samplers 151 are, for PAM-2 signaling, $d_{-1}=1$, $d_0=1$, and $d_{+1}=0$, and the late error sampler 153 sampled $e_{L0}=0$ coincident with the $d_0$ sample, it indicates to phase adjustment 170 that phase-adjusted clock signal CK is too late relative to the data stream (DS) being received. In response, phase adjustment 170 adjusts phase-adjusted clock signal CK to decrease the phase difference between the data stream being received and phase-adjusted clock CK. In an embodiment, the data and error sample patterns $\{d_{-1}=0, d_0=1, d_{+1}=1, e_{E0}=0\}$ and $\{d_{-1}=1, d_0=1, d_{+1}=0, e_{L0}=0\}$ are the only patterns that cause phase adjustment 170 to adjust the phase of phase-adjusted clock signal CK. It should be understood that these data patterns are examples. Other data patterns may be used as indicators that the phase of the phase-adjusted clock signal should be adjusted.

In another example, for PAM-4 signaling, when the three consecutive samples taken by data samplers 151 are $d_{-1}=-3$ or $-1$, $d_0=3$, and $d_{+1}=3$, and the early error sampler 152 sampled $e_{E0}=0$ coincident with the $d_0$ sample, it indicates to phase adjustment 170 that phase-adjusted clock signal CK is too early relative to the data stream (DS) being received. In response, phase adjustment 170 adjusts phase-adjusted clock signal CK to increase the phase difference between the data stream being received and phase-adjusted clock CK. When the three consecutive samples taken by data samplers 151 are $d_{-1}=3$, $d_0=3$, and $d_{+1}=-1$ or $-3$, and the late error sampler 153 sampled $e_{L0}=0$ coincident with the $d_0$ sample, it indicates to phase adjustment 170 that phase-adjusted clock signal CK is too late relative to the data stream (DS) being received. In response, phase adjustment 170 adjusts phase-adjusted clock signal CK to decrease the phase difference between the data stream being received and phase-adjusted clock CK. In an embodiment, the data and error sample patterns $\{d_{-1}=-3, d_0=3, d_{+1}=3, e_{E0}=0\}$, $\{d_{-1}=-1, d_0=3, d_{+1}=3, e_{E0}=0\}$, $\{d_{-1}=3, d_0=3, d_{+1}=-1, e_{L0}=0\}$ and $\{d_{-1}=3, d_0=3, d_{+1}=-3, e_{L0}=0\}$ are the only patterns that cause phase adjustment 170 to adjust the phase of phase-adjusted clock signal CK. It should be understood that these data patterns are examples. Other data patterns may be used as indicators that the phase of the phase-adjusted clock signal should be adjusted.

In an embodiment, control circuitry 130 uses early threshold voltage $V_E$ and late threshold voltage $V_L$ to adjust/change/control the phase of phase-adjusted clock signal CK relative to the transitions of the data (DS) being received from driving integrated circuit 110. For example, control circuitry 130 may set the difference ($\Delta V_T$) between early threshold voltage $V_E$ and late threshold voltage $V_L$ to optimize a particular figure-of-merit such as bit error rate (BER) or signal eye opening. Example pseudo-code for optimization/calibration is given in Table 1.

TABLE 1

Loop $\Delta V_T$ from $\Delta V_{T\text{-}min}$ to $\Delta V_{T\text{-}max}$ in steps of $\Delta V_{T\text{-}step}$
   Determine figure-of-merit (FOM) at current $\Delta V_T$
   If current FOM is better than any previous FOM, then:
      Save current $\Delta V_T$ value as best setting
End loop
Set $\Delta V_T$ to best $\Delta V_T$ value.

Figure 2A:
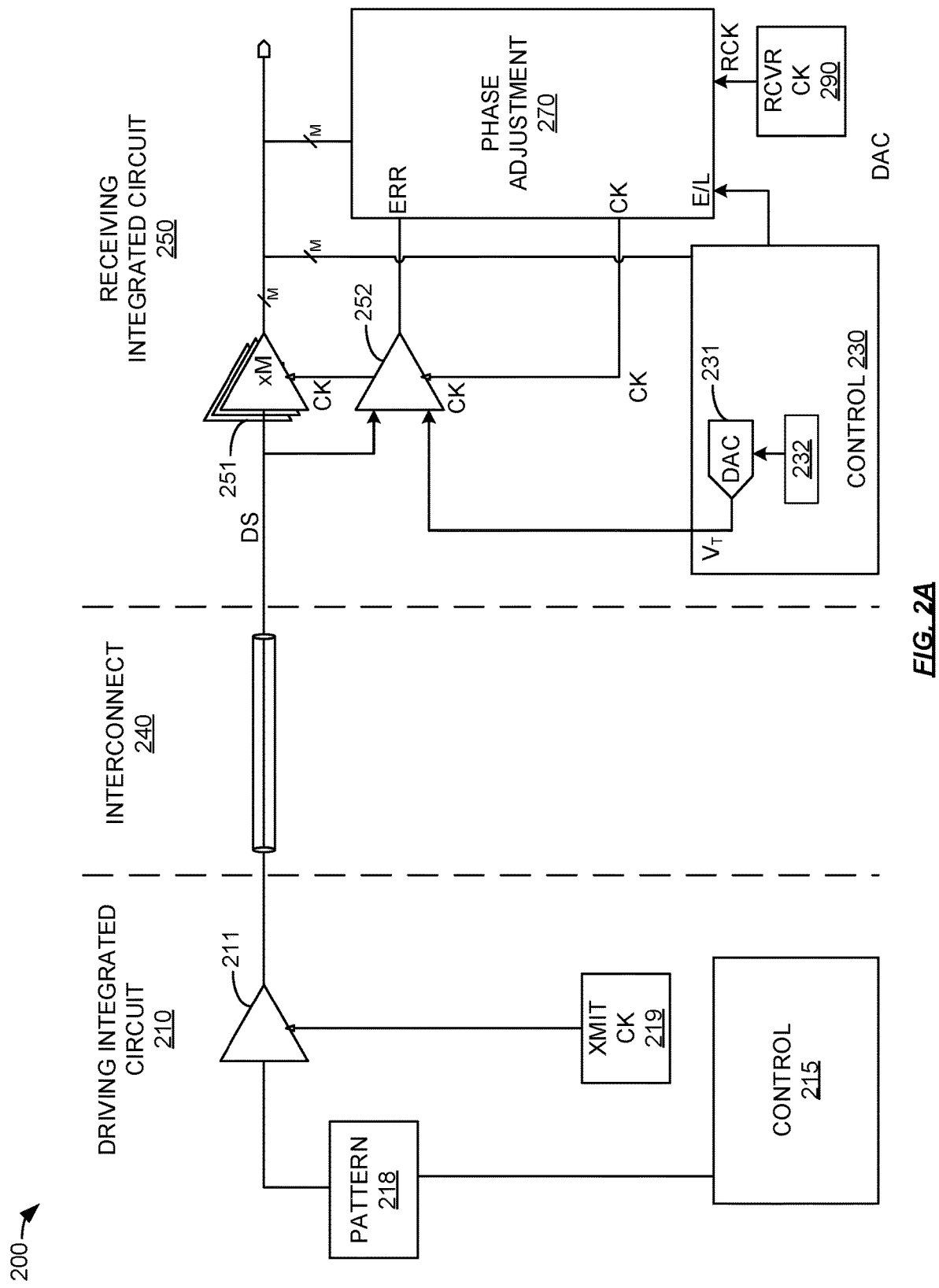
FIG. 2A-2C are block diagrams illustrating example systems.
Figure 2B:
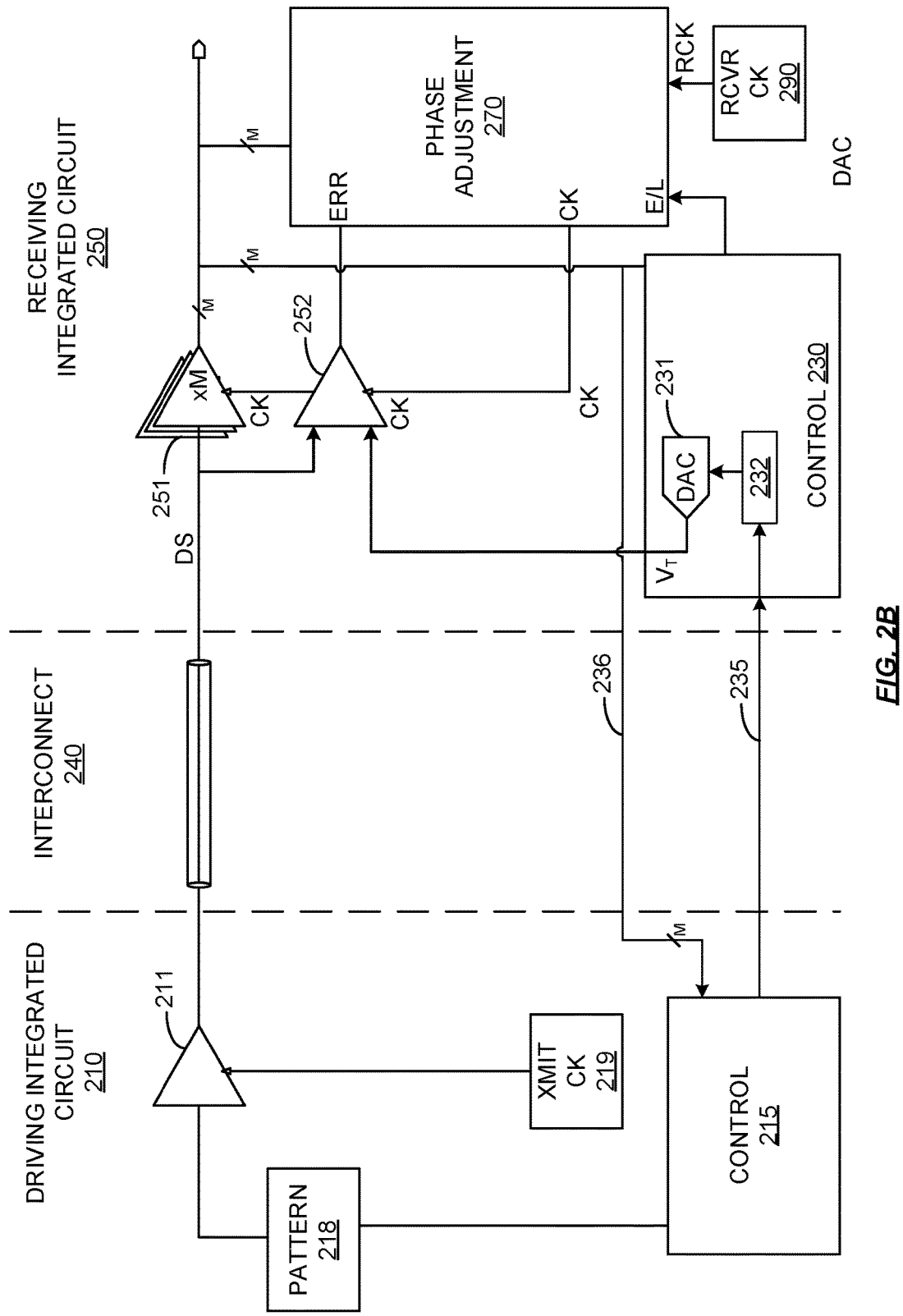
Figure 2C:
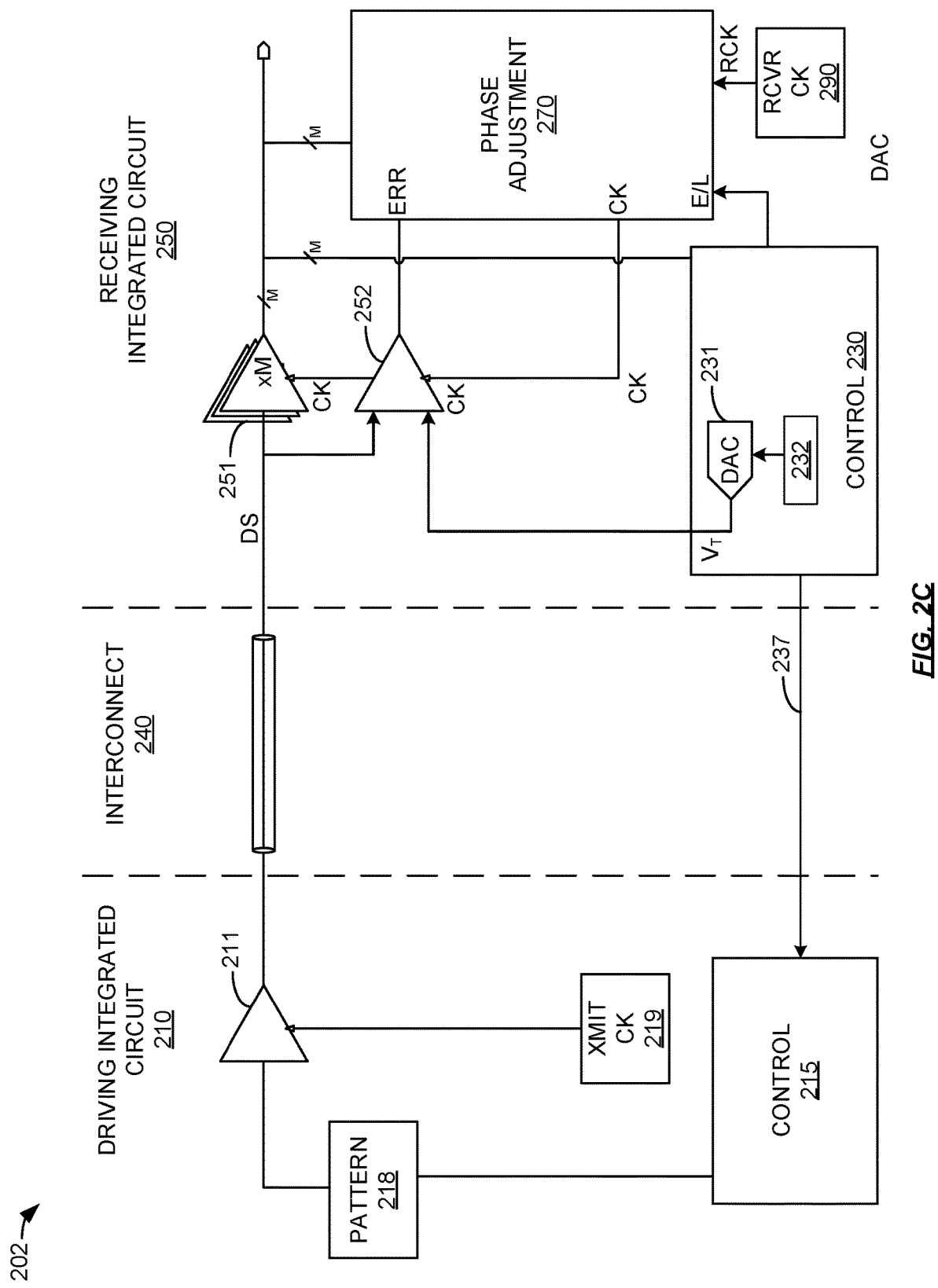

FIGS. 2A-2C are a block diagrams illustrating an example system. In FIG. 2A, communication system 200 comprises a driving integrated circuit 210, a receiving integrated circuit 250, and interconnect 240 between them. Driving integrated circuit 210 includes transmitter circuit 211 (a.k.a., a driver), control circuitry 215, and pattern circuitry 218, and transmit clock source 219. Receiving integrated circuit 250 includes one or more data sampler circuits 251 (a.k.a., data samplers or data slicers), error sampler 252, control circuitry 230, phase adjustment circuit 270, and receiver clock source 290. Control circuitry 230 includes digital-to-analog converter (DAC) 231 and registers 232. Interconnect 240 typically comprises a printed circuit (PC) board, connector, cable, flex circuit, other substrate, and/or a combination of these. Interconnect 240 may be and/or include one or more transmission lines. It should also be understood that although system 200 is illustrated as transmitting a single-ended signal, the signals sent by the driving integrated circuit 210 of system 200 may represent a pair of differential signals.

Driving integrated circuit 210 comprises a transmitter circuit 211. Transmitter circuit 211 is operatively coupled to transmit clock source 219 to receive at least one timing reference signal that determines when data received by transmitter circuit 211 from driving integrated circuit 210 is output by transmitter circuit 211. Driving integrated circuit 210 includes control circuitry 215 and pattern circuitry 218. Pattern circuitry 218 may be configured by control circuitry 215 to provide a repeating pattern to be transmitted by transmitter circuit 211 to receiving integrated circuit 250. The repeating pattern may be a calibration pattern.

The output of transmitter circuit 211 is coupled to the data inputs of data samplers 251 and error sampler 252 via interconnect 240. Data samplers 251 receive a sample clock (CK) from phase adjustment 270. Data samplers 251 sample (or resolve) the voltage level at their data input (i.e., from interconnect 240) against one or more threshold voltages (e.g., PAM-4 compatible threshold voltages of $-\alpha$, 0, and $+\alpha$ for M=3) according to timing provided by sample clock CK. Error sampler 252 also receives the sample clock CK from phase adjustment 270. Error sampler 252 samples (or resolves) the voltage level at its data input (i.e., from interconnect 240) against a controllable threshold voltage, $V_T$, received from control circuitry 230 according to timing provided by sample clock CK.

DAC 231 is controlled by register 232 to output an analog voltage level ($V_T$) that is used as a threshold voltage for error sampler 252. Control circuitry 230 provides a signal (E/L) to phase adjustment 270 indicating whether the threshold voltage being provided to error sampler 252 corresponds to an early threshold voltage ($V_E$) or a late threshold voltage ($V_L$). In this manner, a single error sampler may be used as both an early error sample and a late error sampler.

The M outputs from data samplers 251 may be decoded to produce N number of received bits. For example, for PAM-4 communication system, three (3) data samplers (i.e., M=3) are used to compare the input voltage to three threshold voltages ($-\alpha$, 0, and $+\alpha$). These three outputs may be decoded to produce a two (2) bit output. This two bit output may be represented by the numbers 3, 1, −1, and 3. In another example, for PAM-2 communication system, one (1) data sampler (i.e., M=1) can be used to compare the input voltage to a single threshold voltage (e.g., 0). This output corresponds to a one (1) bit output represented by the numbers 0 and 1.

In FIGS. 2A-2C, there are M number of data samplers 251. Thus, the number of outputs from data samplers 251 is M signals respectively indicating whether the voltage at the inputs of these M data samplers 251 is greater than, or less than, the corresponding M number of threshold voltages. These M signals are provided to phase adjustment 270 and control circuitry 230.

Receiving integrated circuit 250 also includes receiver clock source 290. Receiver clock source 290 is operatively coupled to phase adjustment 270. Phase adjustment 270 receives a clock signal (RCK) from receiver clock source 290. Phase adjustment 270 changes the phase of clock signal RCK to produce phase-adjusted clock signal CK.

Phase adjustment 270 provides a phase-adjusted clock signal CK to data samplers 251, and error sampler 252 of receiving integrated circuit 250. Based on a data pattern comprising the data symbols from three consecutive samples ($d_{-1}$, $d_0$, $d_{+1}$), and an error sample (e.g., $e_0$ from error sampler 252) taken at the same time as the middle of the three samples, phase adjustment 270 adjusts the phase change applied to the clock signal RCK to produce phase-adjusted clock signal CK.

In particular, for example, when the three consecutive samples taken by data samplers 251 are, for PAM-2 signaling, $d_{-1}=0$, $d_0=1$, and $d_{+1}=1$, register 232 is controlling DAC 231 to output an early threshold voltage level (i.e., $V_T=V_E$ and E/L signal indicates "early"), and the error sampler 252 sampled $e_0=0$ coincident with the $d_0$ sample, it indicates to phase adjustment 270 that phase-adjusted clock signal CK is too early relative to the data stream (DS) being received. In response, phase adjustment 270 adjusts phase-adjusted clock signal CK to increase the phase difference between the data stream being received and phase-adjusted clock CK. When the three consecutive samples taken by data samplers 251 are, for PAM-2 signaling, $d_{-1}=1$, $d_0=1$, and $d_{+1}=0$, register 232 is controlling DAC 231 to output a late threshold voltage level (i.e., $V_T=V_L$ and E/L signal indicates "late"), and the error sampler sampled $e_0=0$ coincident with the do sample, it indicates to phase adjustment 270 that phase-adjusted clock signal CK is too late relative to the data stream (DS) being received. In response, phase adjustment 270 adjusts phase-adjusted clock signal CK to decrease the phase difference between the data stream being received and phase-adjusted clock CK. In an embodiment, the data and error sample patterns {$d_{-1}=0$, $d_0=1$, $d_{+1}=1$, $e_0=0$ when $V_T=V_E$} and {$d_{-1}=1$, $d_0=1$, $d_{+1}=0$, $e_0=0$ when $V_T=V_L$} are the only patterns that cause phase adjustment 270 to adjust the phase of phase-adjusted clock signal CK. It should be understood that these data patterns are examples. Other data patterns may be used as indicators that the phase of the phase-adjusted clock signal should be adjusted.

In another example, for PAM-4 signaling, when the three consecutive samples taken by data samplers 251 are $d_{-1}=-3$ or −1, $d_0=3$, and $d_{+1}=3$, register 232 is controlling DAC 231 to output an early threshold voltage level (i.e., $V_T=V_E$ and E/L signal indicates "early"), and error sampler 252 sampled $e_0=0$ coincident with the $d_0$ sample, it indicates to phase adjustment 270 that phase-adjusted clock signal CK is too early relative to the data stream (DS) being received. In response, phase adjustment 270 adjusts phase-adjusted clock signal CK to increase the phase difference between the data stream being received and phase-adjusted clock CK. When the three consecutive samples taken by data samplers 251 are $d_{-1}=3$, $d_0=3$, and $d_{+1}=-1$ or −3, register 232 is controlling DAC 231 to output a late threshold voltage level (i.e., $V_T=V_L$ and E/L signal indicates "late"), and the error sampler sampled $e_0=0$ coincident with the $d_0$ sample, it indicates to phase adjustment 270 that phase-adjusted clock signal CK is too late relative to the data stream (DS) being received. In response, phase adjustment 270 adjusts phase-adjusted clock signal CK to decrease the phase difference between the data stream being received and phase-adjusted clock CK. In an embodiment, the data and error sample patterns {$d_{-1}=-3$, $d_0=3$, $d_{+1}=3$, $e_0=0$ when $V_T=V_E$}, {$d_{-1}=-1$, $d_0=3$, $d_{+1}=3$, $e_0=0$ when $V_T=V_E$}, {$d_{-1}=3$, $d_0=3$, $d_{+1}=-1$, $e_0=0$ when $V_T=V_L$} and {$d_{-1}=3$, $d_0=3$, $d_{+1}=-3$, $e_0=0$ when $V_T=V_L$} are the only patterns that cause phase adjustment 270 to adjust the phase of phase-adjusted clock signal CK. It should be understood that these data patterns are examples. Other data patterns may be used as indicators that the phase of the phase-adjusted clock signal should be adjusted.

In an embodiment, control circuitry 230 uses early threshold voltage $V_E$ and late threshold voltage $V_L$ to adjust/change/control the phase of phase-adjusted clock signal CK relative to the transitions of the data (DS) being received from driving integrated circuit 210. For example, control circuitry 230 may set the difference ($\Delta V_T$) between early threshold voltage $V_E$ and late threshold voltage $V_L$ to optimize a particular figure-of-merit such as bit error rate (BER) or signal eye opening.

FIG. 2B is a block diagram illustrating an example system. In FIG. 2B, communication system 201 comprises a driving integrated circuit 210, a receiving integrated circuit 250, and interconnect 240 between them. Driving integrated circuit 210 includes transmitter circuit 211 (a.k.a., a driver), control circuitry 215, and pattern circuitry 218, and transmit clock source 219. Receiving integrated circuit 250 includes one or more data sampler circuits 251 (a.k.a., data samplers or data slicers), error sampler 252, control circuitry 230, phase adjustment circuit 270, and receiver clock source 290. Control circuitry 230 includes digital-to-analog converter (DAC) 231 and registers 232.

System 201 functions similarly to system 200 of FIG. 2A except that control circuitry 215 of driving integrated circuit 210 sets the threshold voltages used by error sampler 252. Thus, system 201 also includes link 235 and link 236. Link 235 is between control circuitry 215 and control circuitry 230 so that control circuitry 230 may set the value in register 232 thereby setting the threshold voltage $V_T$. Link 236 provides outputs of data samplers 251 to control circuitry 215.

Control circuitry 215 uses early threshold voltage $V_E$ and late threshold voltage $V_L$ to adjust/change/control the phase of phase-adjusted clock signal CK relative to the transitions of the data (DS) being transmitted from driving integrated circuit 210. For example, control circuitry 215 may set the difference ($\Delta V_T$) between early threshold voltage $V_E$ and late threshold voltage $V_L$ to optimize a particular figure-of-merit as indicated by such as bit error rate (BER) or signal eye opening. Control circuitry 215 may set the difference ($\Delta V_T$) between early threshold voltage $V_E$ and late threshold voltage $V_L$ to optimize a particular figure-of-merit that is based on the outputs of data samplers 251.

FIG. 2C is a block diagram illustrating an example system. In FIG. 2C, communication system 202 comprises a driving integrated circuit 210, a receiving integrated circuit 250, and interconnect 240 between them. Driving integrated circuit 210 includes transmitter circuit 211 (a.k.a., a driver), control circuitry 215, and pattern circuitry 218, and transmit clock source 219. Receiving integrated circuit 250 includes one or more data sampler circuits 251 (a.k.a., data samplers or data slicers), error sampler 252, control circuitry 230, phase adjustment circuit 270, and receiver clock source 290. Control circuitry 230 includes digital-to-analog converter (DAC) 231 and registers 232.

System 202 functions similarly to system 200 of FIG. 2A except that control circuitry 230 of receiving integrated circuit 230 can set the pattern generated by pattern generation circuitry 218 thereby setting the pattern transmitted to receiving integrated circuit. Thus, system 202 also includes link 237. Link 237 is between control circuitry 230 and control circuitry 215 so that control circuitry 230 may set the pattern generated by pattern generation circuitry 218.

Thus, for example, control circuitry 230 may set a first pattern to adjust the early threshold voltage $V_E$ and second pattern to adjust the late threshold voltage $V_L$. Control circuitry 230 may to adjust/change/control the phase of phase-adjusted clock signal CK relative to the transitions of the data (DS) being transmitted from driving integrated circuit 210. For example, control circuitry 215 may set the difference ($\Delta V_T$) between early threshold voltage $V_E$ and late threshold voltage $V_L$ to optimize a particular figure-of-merit as indicated by such as bit error rate (BER) or signal eye opening.

Figure 3A:
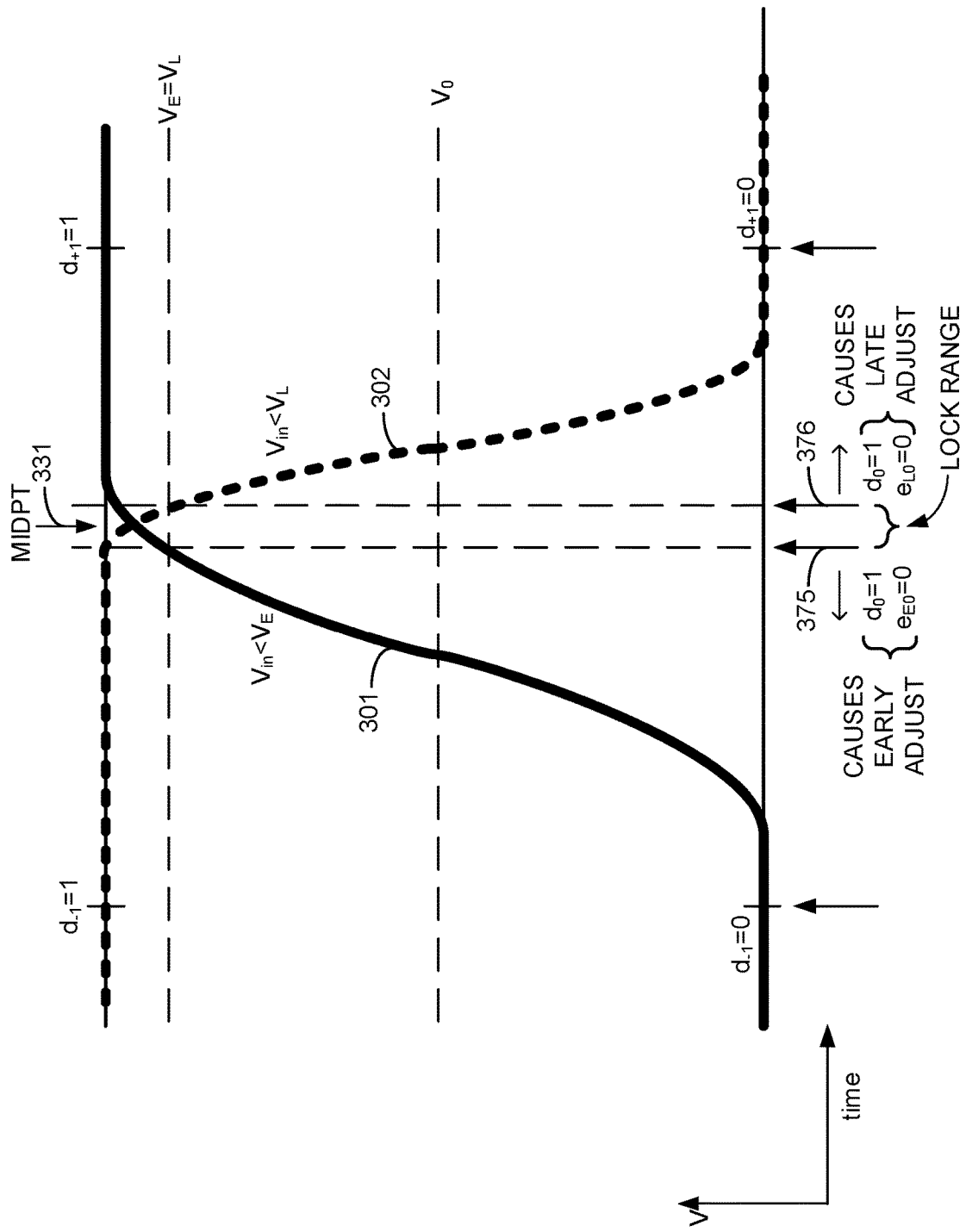
FIG. 3A-3D are diagrams illustrating example phase lock point adjustments using PAM-2 signaling.

FIG. 3A-3D are diagrams illustrating example phase lock point adjustments using PAM-2 signaling. In FIGS. 3A-3D, time is increasing from left to right. In FIGS. 3A-3D waveform 301 illustrates an example PAM-2 rising edge for the pattern $\{d_{-1}=0, d_0=1, d_{+1}=1\}$. Waveform 302 illustrates an example PAM-2 falling edge for the pattern $\{d_{-1}=1, d_0=1, d_{+1}=0\}$. In FIG. 3A, early threshold voltage $V_E$ and late threshold voltage $V_L$ are controlled by control circuitry 130 to be equal (i.e., $\Delta V_T=0$). Sampling times (i.e., phase differences) to the left (i.e., earlier in time) of sampling time 375 indicate to phase adjustment 170 that the phase difference between the incoming data signal and phase-adjusted clock CK is too small (i.e., early) because to the left of sampling time 375 waveform 301 is less than $V_E$. Sampling times to the right (i.e., later in time) of sampling time 375 indicate to phase adjustment 170 that the phase difference between the incoming data signal and phase-adjusted clock CK is not too small (i.e., early) because to the right of sampling time 375 waveform 301 is greater than $V_E$. Sampling times (i.e., phase differences) to the right (i.e., later in time) of sampling time 376 indicate to phase adjustment 170 that the phase difference between the incoming data signal and phase-adjusted clock CK is too large (i.e., late) because to the right of sampling time 376 waveform 302 is less than $V_L$. Sampling times to the left (i.e., earlier in time) of sampling time 376 indicate to phase adjustment 170 that the phase difference between the incoming data signal and phase-adjusted clock CK is not too large (i.e., late) because to the left of sampling time 376 waveform 302 is greater than $V_L$. The midpoint between sampling times 375 and 376 is illustrated in FIG. 3A by arrow 331. Arrow 331 corresponds to the lock point of the baud-rate phase detector.

Figure 3B:
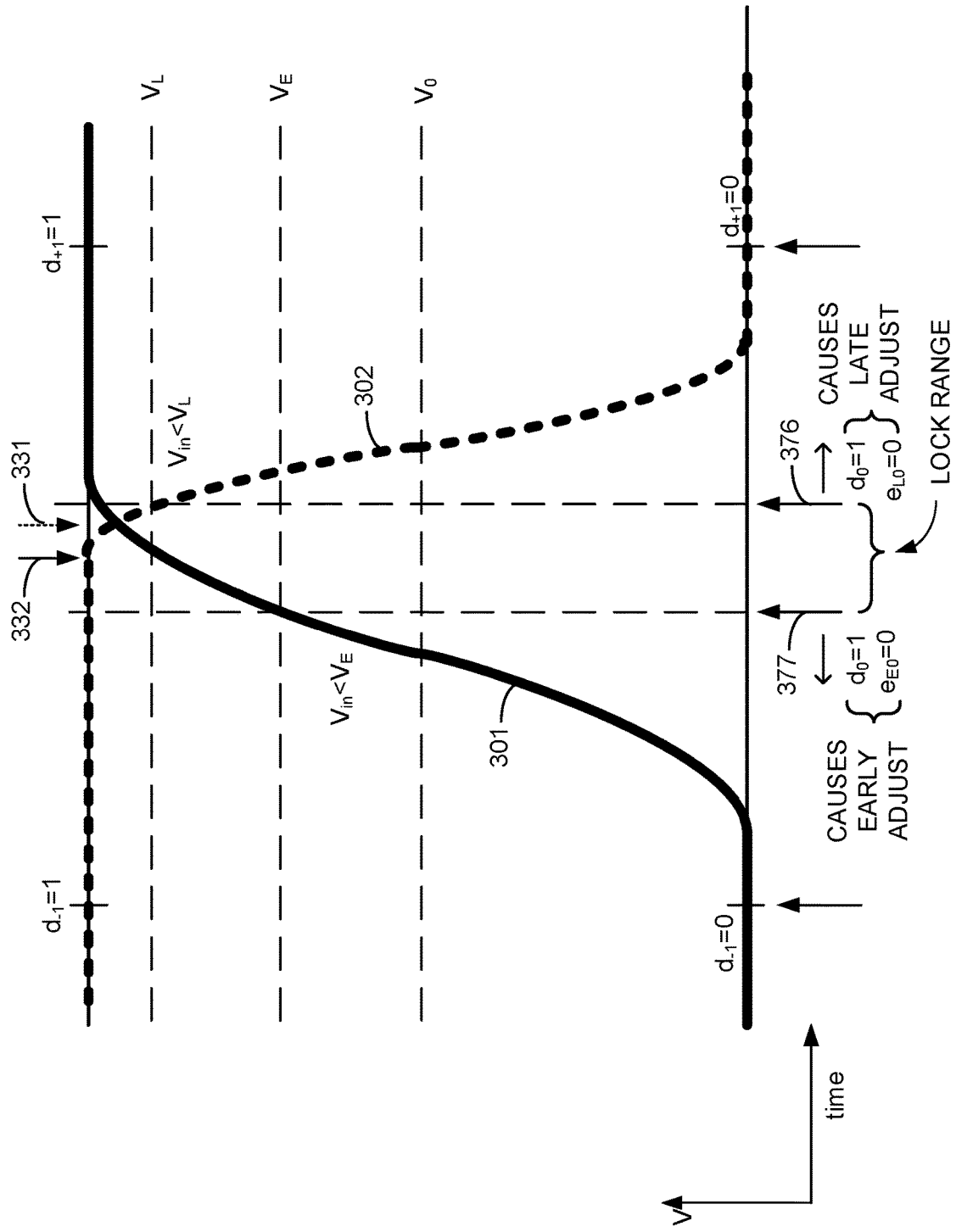

In FIG. 3B, early threshold voltage $V_E$ and late threshold voltage $V_L$ are controlled by control circuitry 130 to be unequal (i.e., $\Delta V_T \neq 0$). In particular, in FIG. 3B, $V_E < V_L$ where the $V_L$ illustrated in FIG. 3B is the same as the $V_L$ in FIG. 3A. Similar to FIG. 3A but with a different $V_E$, sampling times (i.e., phase differences) to the left (i.e., earlier in time) of sampling time 377 indicate to phase adjustment 170 that the phase difference between the incoming data signal and phase-adjusted clock CK is too small (i.e., early) because to the left of sampling time 377 waveform 301 is less than $V_E$. Sampling times to the right (i.e., later in time) of sampling time 377 indicate to phase adjustment 170 that the phase difference between the incoming data signal and phase-adjusted clock CK is not too small (i.e., early) because to the right of sampling time 375 waveform 301 is greater than $V_E$.

Note that by lowering $V_E$ relative to its level in FIG. 3A has moved sampling time 377 left (earlier in time) relative to sampling time 375 in FIG. 3A. The midpoint between sampling times 377 and 376 is illustrated in FIG. 3B by arrow 332. Note that by moving sampling time 377 earlier in time, the midpoint between sampling time 377 and sampling time 376 (as illustrated by midpoint arrow 332) is earlier than the midpoint between sampling time 375 and sampling time 376 (as illustrated by midpoint arrow 331.) Thus, by adjusting the difference between $V_E$ and $V_L$, (and/or the values of $V_E$ and $V_L$) the midpoint of the range where adjustment is called for by the data/error patterns is also adjusted. This allows control circuitry 130 to control the timing of the midpoint in order to optimize a figure-of-merit.

Figure 3C:
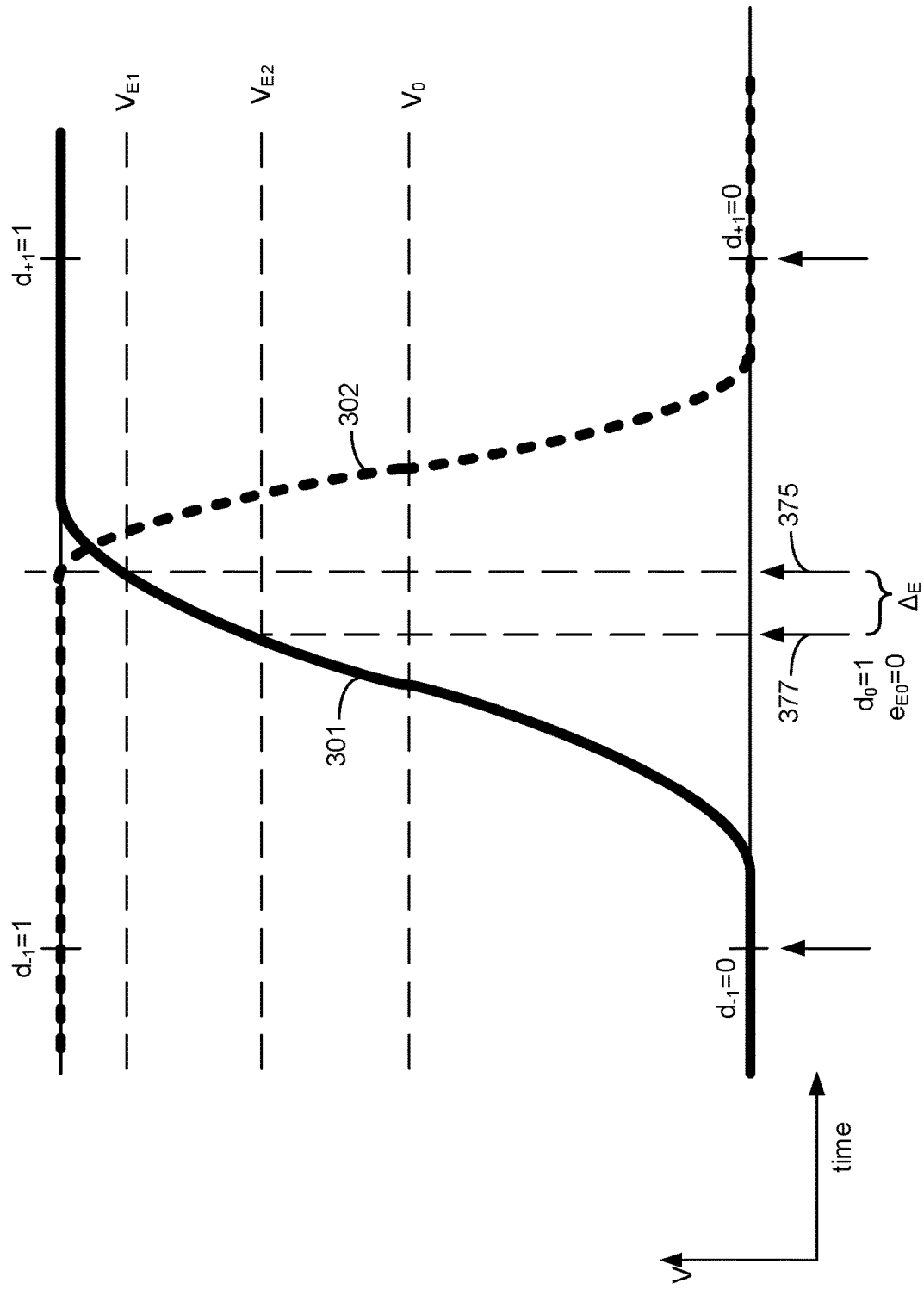

FIG. 3C illustrates the effect of that different early threshold voltages has on the early error indication of the $d_0$ sampling time. In FIG. 3C, the sampling time limits where phase adjustment 170 will take action to correct a sampling time that is too early is illustrated for two different early threshold voltages $V_{E1}$ and $V_{E2}$, where $V_{E1} > V_{E2}$. As is illustrated in FIG. 3C, this results in two different sampling times 377 and 375 that divide sampling times that result in error indicators that phase adjustment 170 should take action to correct the phase of CK from those sampling times that result in error indicators that phase adjustment 170 should not take action to correct the phase of CK. These sampling times 377 and 375 are separated by an amount of time $\Delta_E$. Thus, adjusting $V_E$ can be used to control the location of the sampling time that causes phase adjustment 170 to correct for an early sampling time vs. not taking any action regarding the rising edge pattern $\{d_{-1}=0, d_0=1, d_{+1}=1\}$.

Figure 3D:
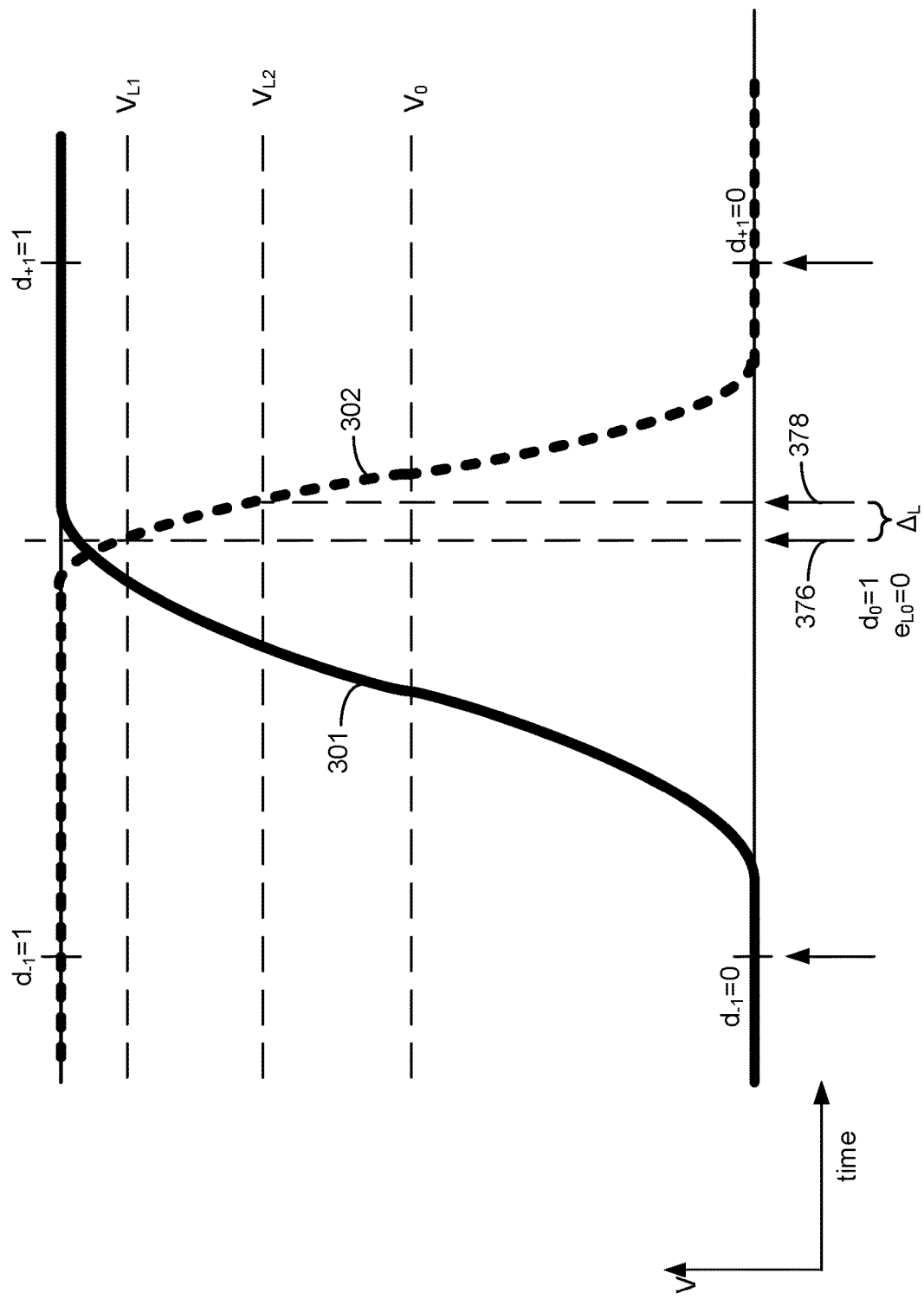

FIG. 3D illustrates the effect of that different late threshold voltages has on the late error indication of the $d_0$ sampling time. In FIG. 3D, the sampling time limits where phase adjustment 170 will take action to correct a sampling time that is too late is illustrated for two different late threshold voltages $V_{L1}$ and $V_{L2}$, where $V_{L1} > V_{L2}$. As is illustrated in FIG. 3D, this results in two different sampling times 376 and 378 that divide sampling times that resulting in error indicators that phase adjustment 170 should take action to correct the phase of CK from those sampling times that result in error indicators that phase adjustment 170 should not take action to correct the phase of CK. These sampling times 376 and 378 are separated by an amount of time $\Delta_L$. Thus, adjusting $V_L$ can be used to control the location of the sampling time that causes phase adjustment 170 to correct for a late sampling time vs. not taking any action regarding the falling edge pattern $\{d_{-1}=1, d_0=1, d_{+1}=0\}$.

Figure 4A:
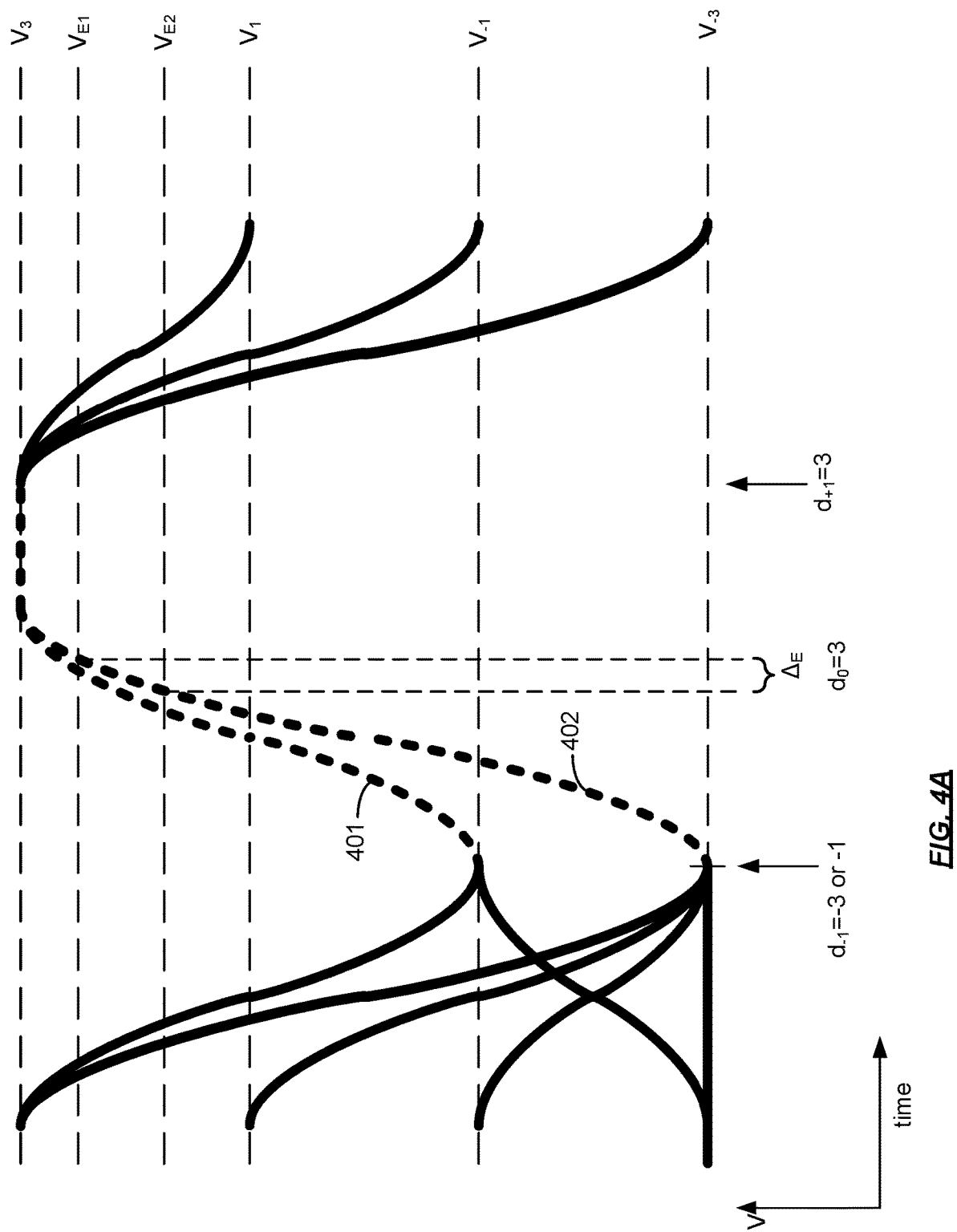
FIGS. 4A-4B are diagrams illustrating example phase lock point adjustment using PAM-4 signaling.
Figure 4B:
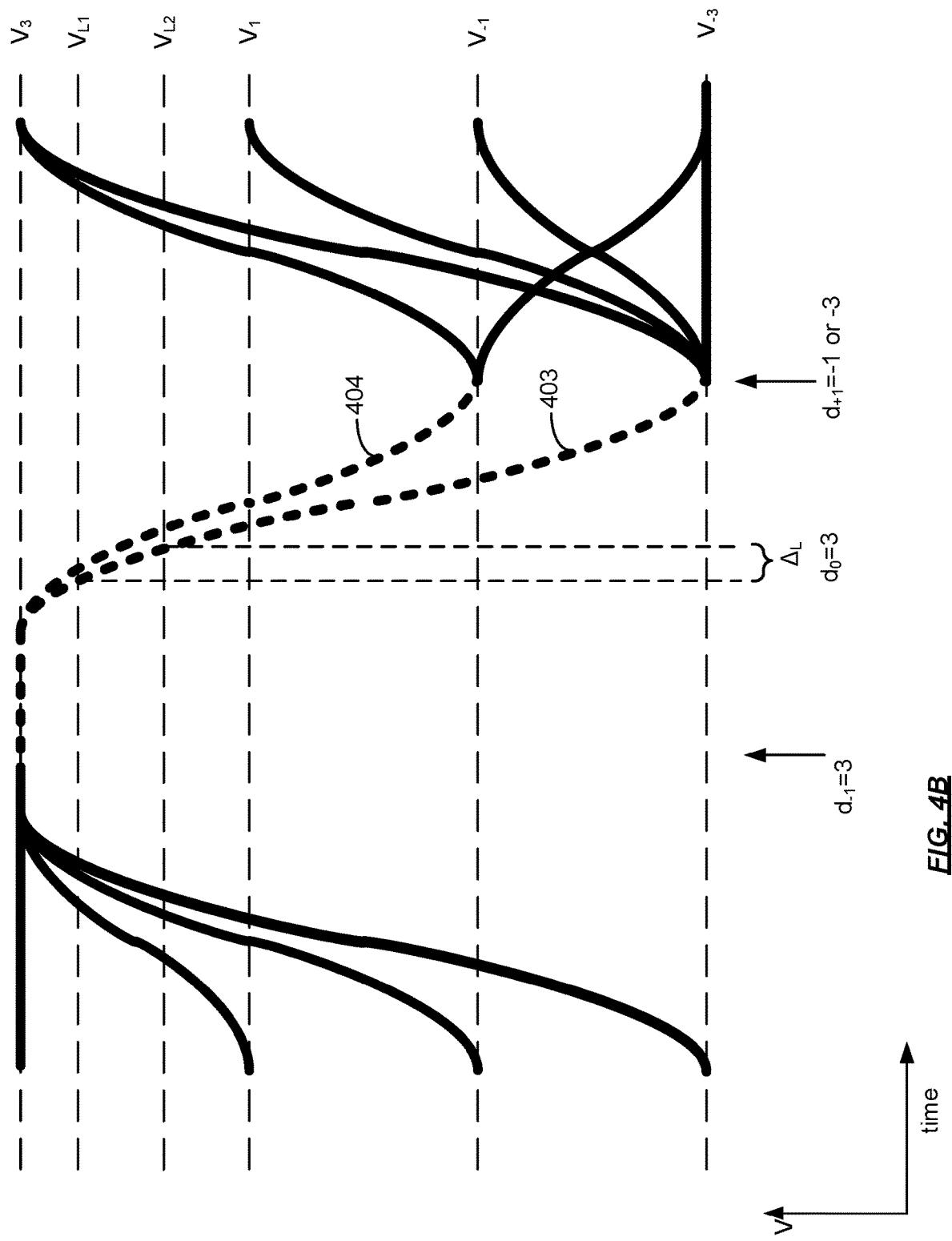

FIGS. 4A-4B are diagrams illustrating example phase lock point adjustments with PAM-4 signaling. In FIGS. 4A-4B, time is increasing from left to right. In FIG. 4A, waveform 401 illustrates an example PAM-4 rising edge for the pattern $\{d_{-1}=-1, d_0=3, d_{+1}=3\}$. Waveform 402 illustrates an example PAM-4 rising edge for the pattern $\{d_{-1}=-3, d_0=3, d_{+1}=3\}$. In FIG. 4A, do sample timing is illustrated for two different early threshold voltages $V_{E1}$ and $V_{E2}$, where $V_{E1} > V_{E2}$. As is illustrated in FIG. 4A, this results in two different sampling times that divide sampling times that result in error indicators that phase adjustment 170 should take action to correct the phase of CK from those sampling times that result in error indicators that phase adjustment 170 should not take action to correct the phase of CK. These sampling times are separated by an amount of time $\Delta_E$. Thus, adjusting $V_E$ for a PAM-4 input signal can be used to control the location of the sampling time that causes phase adjustment 170 to correct for an early sampling time vs. not taking any action regarding the rising edge patterns $\{d_{-1}=-1, d_0=3, d_{+1}=3\}$ and $\{d_{-1}=-3, d_0=3, d_{+1}=3\}$.

In FIG. 4B, waveform 403 illustrates an example PAM-4 falling edge for the pattern $\{d_{-1}=3, d_0=3, d_{+1}=-3\}$. Waveform 404 illustrates an example PAM-4 falling edge for the pattern $\{d_{-1}=3, d_0=3, d_{+1}=-1\}$. In FIG. 4B, do sample timing is illustrated for two different late threshold voltages $V_{L1}$ and $V_{L2}$, where $V_{L1}>V_{L2}$. As is illustrated in FIG. 4B, this results in two different sampling times that divide sampling times that result in error indicators that phase adjustment 170 should take action to correct the phase of CK from those sampling times that result in error indicators that phase adjustment 170 should not take action to correct the phase of CK. These sampling times are separated by an amount of time $\Delta_L$. Thus, adjusting $V_L$ for a PAM-4 input signal can be used to control the location of the sampling time that causes phase adjustment 170 to correct for a late sampling time vs. not taking any action regarding the falling edge patterns $\{d_{-1}=3, d_0=3, d_{+1}=-3\}$ and $\{d_{-1}=3, d_0=3, d_{+1}=-1\}$.

FIG. 5 is a flowchart illustrating a method of phase locking. One or more steps illustrated in FIG. 5 may be performed by, for example, system 100, system 200, system 201, system 202, and/or their components. A first early error sample value is generated by comparing, at a first sampling time, a data signal to a first error threshold voltage (502). For example, during a first cycle of CK and at a first sampling time determined by the phase of CK relative to input data signal DS, early error sampler 152 may produce, by comparing the input signal DS to a first threshold voltage value $V_{E1}$, a first early error sample value that is supplied to phase adjustment 170. A first data sample value is generated by comparing, at the first sampling time, the data signal to at least a first data threshold voltage (504). For example, during the first cycle of CK and at the first sampling time as determined by the phase of CK relative to input data signal DS, data samplers 151 may produce, by comparing the input data signal to an appropriate threshold voltage(s), a one (for PAM-2) or more (for PAM-4 etc.) data sample values that are supplied to phase adjustment 170.

Based on the first early error sample value and the first data sample value, a first early error signal value is generated (506). For example, based on $e_{E0}$ being equal to 0, and $d_0$ being equal to 1 as part of the rising edge pattern $\{d_{-1}=0, d_0=1, d_{+1}=1\}$, phase adjustment 170 may internally determine an early error signal value that indicates whether or not to adjust the phase difference between CK relative to the input signal DS because CK is occurring too early (or not) relative to the input data signal DS.

A first late error sample value is generated by comparing, at a second sampling time, the data signal to a second error threshold voltage (508). For example, during a second (different from the first) cycle of CK and thereby being at a second sampling time that is also determined by the phase of CK relative to input data signal DS, late error sampler 153 may produce, by comparing the input signal DS to a second threshold voltage value $V_{L1}$, a first late error sample value that is supplied to phase adjustment 170. A second data sample value is generated by comparing, at the second sampling time, the data signal to at least the first data threshold voltage (510). For example, during the second cycle of CK and at the second sampling time as determined by the phase of CK relative to input data signal DS, data samplers 151 may produce, by comparing the input data signal to an appropriate threshold voltage(s), a one (for PAM-2) or more (for PAM-4 etc.) data sample values that are supplied to phase adjustment 170.

Based on the first late error sample value and the second data sample value, a first late error signal value is generated (512). For example, based on $e_{L0}$ being equal to 0, and $d_0$ being equal to 1 as part of the falling edge pattern $\{d_0=1, d_{+1}=0\}$, phase adjustment 170 may internally determine a late error signal value that indicates whether or not to adjust the phase difference between CK relative to the input signal DS because CK is occurring too late (or not) relative to the input data signal DS.

Based on the first early error signal value and the first late error signal value, a phase relationship between the data signal and a timing reference that determined the first sampling time and the second sampling time is adjusted (514). For example, based on the early error signal value and the late error signal value, phase adjustment 170 may adjust the phase of CK relative to the input data signal DS. In other words, if the early error signal value indicated that CK was too early relative to DS, phase adjustment 170 may increase the phase delay from the transitions on DS and the transitions on CK that cause samplers 151-153 to sample. Likewise, if the late error signal value indicated that CK was too late relative to DS, phase adjustment 170 may decrease the phase delay from the transitions on DS and the transitions on CK that cause samplers 151-153 to sample. If neither the early error signal value nor the late error signal value indicated an adjustment was indicated, phase adjustment 170 may, for example, not make an adjustment.

Figure 6:
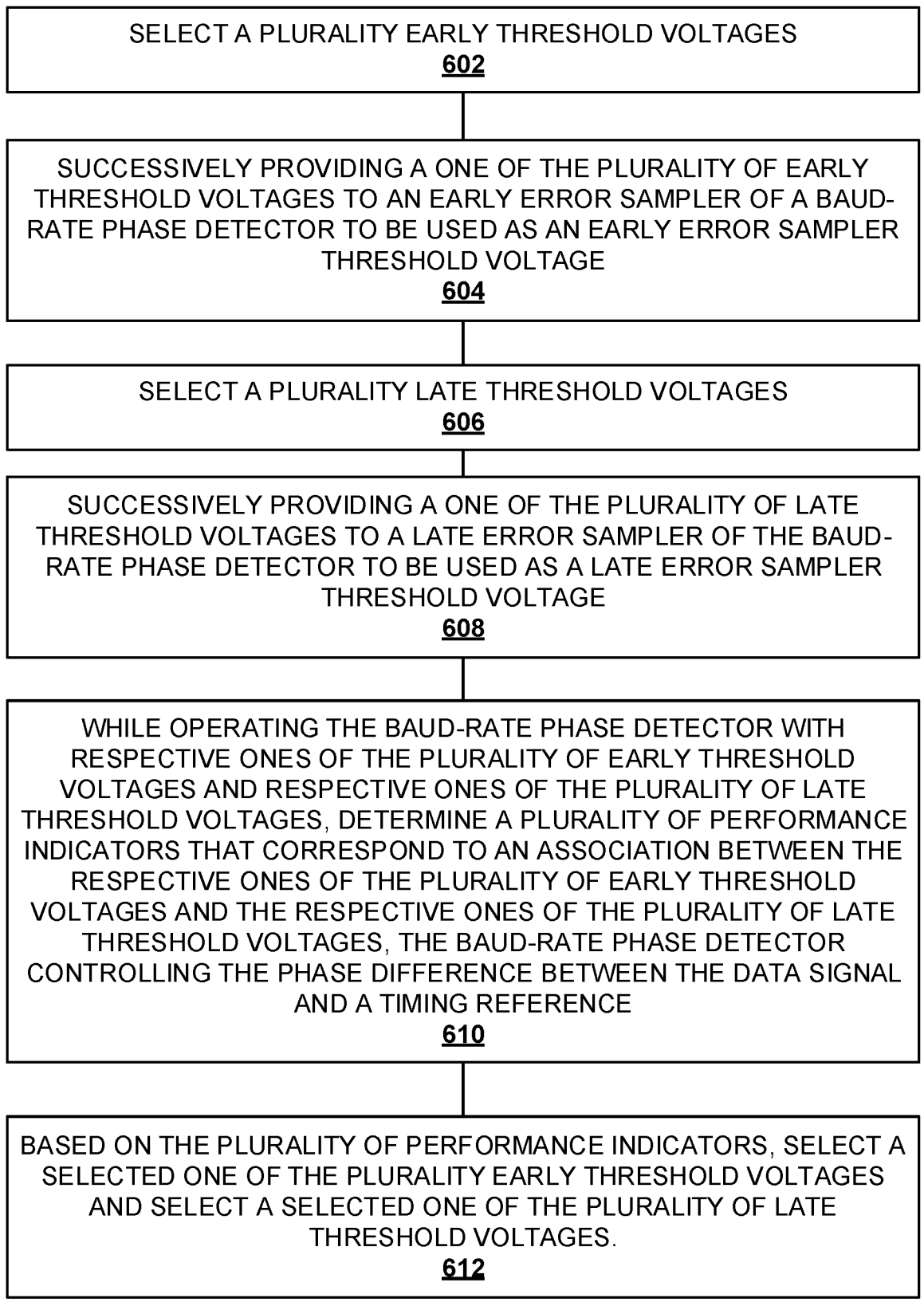
FIG. 6 is a flowchart illustrating a method of calibrating a phase detector.

FIG. 6 is a flowchart illustrating a method of calibrating a phase detector. One or more steps illustrated in FIG. 6 may be performed by, for example, system 100, system 200, system 201, system 202, and/or their components. A plurality of early threshold voltages are selected (602). For example, control circuitry 130 select range (e.g., $V_{E,min}$ to $V_{E,max}$) and voltage step (e.g., $V_{E,step}$) for $V_E$.

A one of the plurality of early threshold voltages are each successively provided to an early error sampler of a baud-rate phase detector to be used as an early error sampler threshold voltage (604). For example, control circuitry 130 may successively supply early error sampler 152 with early error threshold voltages $V_E$ that are swept through the selected range $V_{E,min}$ to $V_{E,max}$ at the selected step $V_{E,step}$.

A plurality of late threshold voltages are selected (606). For example, control circuitry 130 select range (e.g., $V_{L,min}$ to $V_{L,max}$) and voltage step (e.g., $V_{L,step}$) for $V_L$. A one of the plurality of late threshold voltages are each successively provided to a late error sampler of the baud-rate phase detector to be used as a late error sampler threshold voltage (608). For example, control circuitry 130 may successively supply late error sampler 153 with late error threshold voltages $V_L$ that are swept through the selected range $V_{L,min}$ to $V_{L,max}$ at the selected step $V_{L,step}$.

While operating the baud-rate phase detector with respective ones of the plurality of early threshold voltages and respective ones of the plurality of late threshold voltages, a plurality of performance indicators are determined that correspond to an association between the respective ones of the plurality of early threshold voltages and respective ones of the plurality of late threshold voltages while the baud-rate phase detector is controlling the phase difference between a data signal and a timing reference (610). For example, while receiving integrated circuit 150 is receiving a data stream DS from driving integrated circuit 110 via interconnect 140, control circuitry 130 may sweep one or more of $V_E$ and $V_L$. At each step in the sweep(s), control circuitry 130 may wait for the feedback loop formed by samplers 151-153 and phase adjustment 170 to settle. Once the feedback loop has settled, control circuitry may determine a performance indicator (a.k.a., figure-of-merit) for the current settings.

Based on the plurality of performance indicators, a one of the plurality of early threshold voltages and a one of the plurality of late threshold voltages are selected (612). For example, based on the performance indicators associated with each of the $V_E$ and/or $V_L$ settings that were tried, control circuitry 130 may select values for $V_E$ and/or $V_L$ that optimizes (e.g., minimizes or maximizes, as appropriate) the performance indicator (e.g., BER, eye characteristic.)

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, and its components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
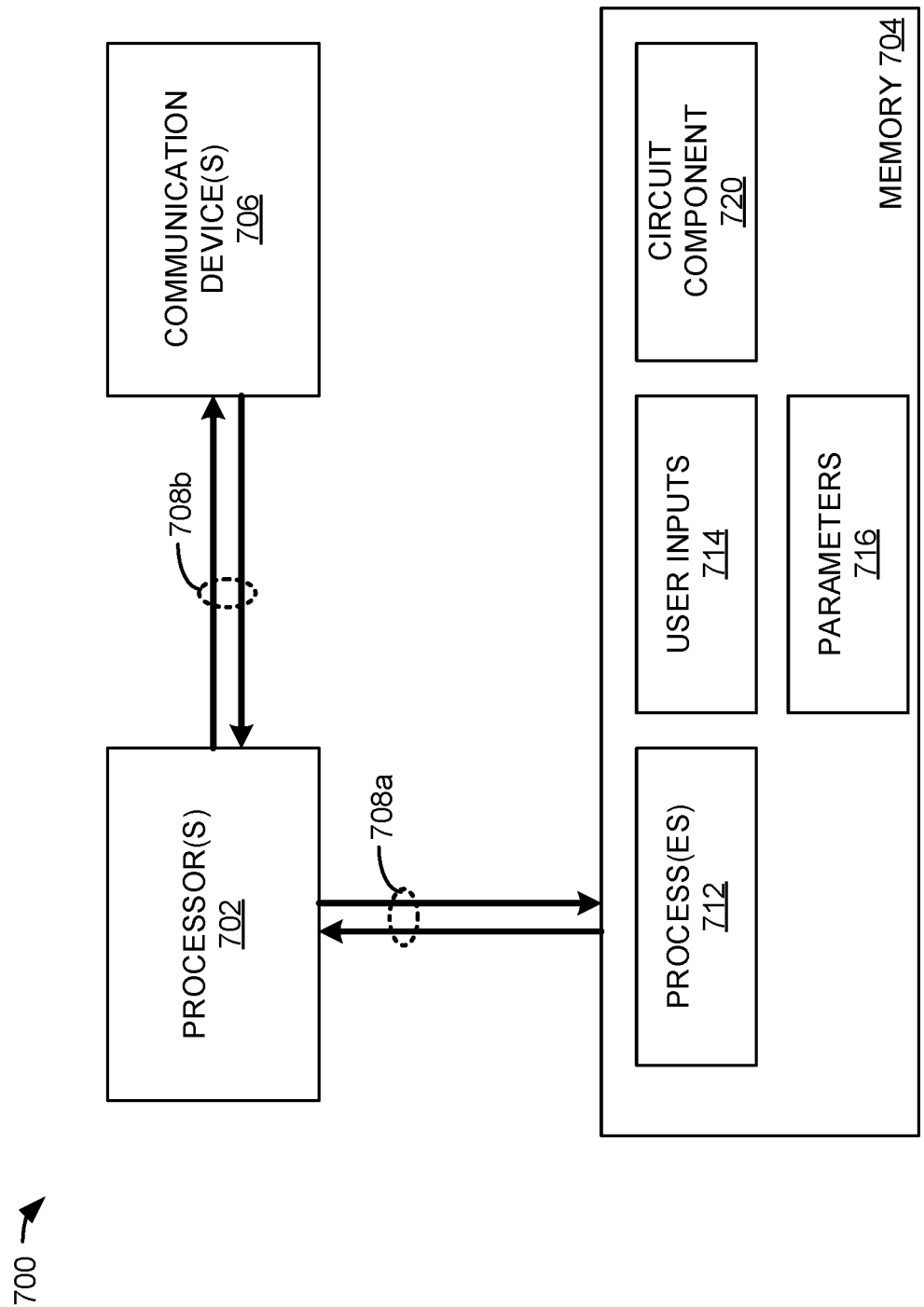
FIG. 7 is a block diagram illustrating a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using one or more serial links 708a-708b. Serial links 708a-708b may communicate and/or be calibrated using the circuits and techniques described herein.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of system 100, and its components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

Implementations discussed herein include, but are not limited to, the following examples:

Example 1: An integrated circuit, comprising: a sampling timing reference to be phase adjusted relative to a data signal based on an early error signal and a late error signal; and a baud-rate phase detector to provide the early error signal and the late error signal, the early error signal to be based on an early error sample that used a first error threshold voltage, the late error signal to be based on a late error sample, the first error threshold voltage not equal to the second error threshold voltage.

Example 2: The integrated circuit of example 1, wherein a first timing of the early error sample and a first data sample are determined by a same first transition of the sampling timing reference.

Example 3: The integrated circuit of example 2, wherein a second timing of the late error sample and a second data sample are determined by a same second transition of the sampling timing reference.

Example 4: The integrated circuit of example 1, wherein a first data sample and a second data sample further use at least a first data threshold voltage and a second data threshold voltage.

Example 5: The integrated circuit of example 4, wherein the data signal uses PAM-4 signaling.

Example 6: The integrated circuit of example 1, wherein the sampling timing reference comprises a plurality of timing references having different phases with respect to each other of the plurality of timing references.

Example 7: The integrated circuit of example 6, wherein the early error sample is taken by a first one of N number of early error samplers using a first error threshold voltage and the late error sample is taken by a first one of N number of late error samplers using a second error threshold voltage.

Example 8: A method of providing baud-rate phase detection, comprising: generating a first early error sample value by comparing, at a first sampling time, a data signal to a first error threshold voltage; generating a first data sample value by comparing, at the first sampling time, the data signal to at least a first data threshold voltage; based on the first early error sample value and the first data sample value, generating a first early error signal value; generating a first late error sample value by comparing, at a second sampling time, the data signal to a second error threshold voltage, the second error threshold voltage not equal to the first error threshold voltage; generating a second data sample value by comparing, at the second sampling time, the data signal to at least the first data threshold voltage; based on the first late error sample value and the second data sample value, generating a first late error signal value; and, based on the first early error signal value and the first late error signal value, adjust a phase relationship between the data signal and a timing reference that determined the first sampling time and the second sampling time.

Example 9: The method of example 8, wherein the first sampling time and the second sampling time are different in time by an integer multiple of a symbol period of the data signal, the integer multiple being greater than or equal to zero.

Example 10: The method of example 8, wherein the first data sample value is generated by further comparing, at the first sampling time, the data signal to at least a second data threshold voltage, and wherein the second data sample value is generated by further comparing, at the second sampling time, the data signal to at least the second data threshold voltage.

Example 11: The method of example 8, wherein the first early error signal value is further based on a third data sample value and a fourth data sample value, and the first late error signal value is further based on a fifth data sample value and a sixth data sample value.

Example 12: The method of example 11, further comprising: generating the third data sample value by comparing, at a third sampling time, the data signal to at least the first data threshold voltage, the third sampling time being a symbol period of the data signal before the first sampling time; generating the fourth data sample value by comparing, at a fourth sampling time, the data signal to at least the first data threshold voltage, the fourth sampling time being the symbol period of the data signal after the first sampling time; generating the fifth data sample value by comparing, at a fifth sampling time, the data signal to at least the first data threshold voltage, the fifth sampling time being the symbol period of the data signal before the second sampling time; and, generating the sixth data sample value by comparing, at a sixth sampling time, the data signal to at least the first data threshold voltage, the sixth sampling time being the symbol period of the data signal after the second sampling time.

Example 13: The method of example 8, further comprising: based on the first early error signal value and the first late error signal value, adjusting, to a first phase difference value, a phase difference between the data signal and a timing reference that determined the first sampling time and the second sampling time.

Example 14: The method of example 13, further comprising: while the phase difference between the data signal and the timing reference is operating at the first phase difference value, determining a first performance indicator.

Example 15: The method of example 14, further comprising: based on a second early error signal value and a second late error signal value, adjusting, to a second phase difference value, the phase difference between the data signal and the timing reference; while the phase difference between the data signal and the timing reference is operating at the second phase difference value, determining a second performance indicator; and, based on the first performance indicator and the second performance indicator, adjust at least one of the first error threshold voltage and the second error threshold voltage.

Example 16: The method of example 15, wherein the first performance indicator and the second performance indicator are based at least on a bit error rate of a received version of the data signal.

Example 17: The method of example 15, wherein the first performance indicator and the second performance indicator are based at least on a measurement of a vertical eye opening of a received version of the data signal.

Example 18: A method of adjusting a phase difference between a data signal and a timing reference, comprising: selecting a plurality of early threshold voltages; successively providing a one of the plurality of early threshold voltages to an early error sampler of a baud-rate phase detector to be used as an early error sampler threshold voltage; selecting a plurality late threshold voltages; successively providing a one of a plurality of late threshold voltages to a late error sampler of the baud-rate phase detector to be used as a late error sampler threshold voltage; while operating the baud-rate phase detector with respective ones of the plurality of early threshold voltages and respective ones of the plurality of late threshold voltages, determine a plurality of performance indicators that correspond to an association between the respective ones of the plurality of early threshold voltages and the respective ones of the plurality of late threshold voltages while the baud-rate phase detector is controlling the phase difference between the data signal and the timing reference; and, based on the plurality of performance indicators, select a selected one of the plurality of early threshold voltages and select a selected one of the plurality of late threshold voltages.

Example 19: The method of example 18, further comprising: provide the baud-rate phase detector with the selected one of the plurality of early threshold voltages and the selected one of the plurality of early threshold voltages.

Example 20: The method of example 19, wherein the data signal is a PAM-4 type signal.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
   a sampling timing reference to be phase adjusted relative to a data signal based on an early error signal value and a late error signal value, the sampling timing reference to determine a first sampling time and a second sampling time; and a baud-rate phase detector to generate the early error signal value and the late error signal value, the early error signal value to be based on an early error sample value and a first data sample value, the early error sample value generated by comparing, at the first sampling time, the data signal to a variable first error threshold voltage, the first data sample value generated by comparing, at the first sampling time, the data signal to a first data threshold voltage, the late error signal value to be based on a late error sample value and a second data sample value, the late error sample value generated by comparing, at the second sampling time, the data signal to a variable second error threshold voltage, the second data sample value generated by comparing, at the second sampling time, the data signal to the first data threshold voltage, the variable first error threshold voltage not equal to the variable second error threshold voltage.

2. The integrated circuit of claim 1, wherein the data signal uses PAM-2 signaling.

3. The integrated circuit of claim 1, wherein the data signal uses PAM-4 signaling.

4. The integrated circuit of claim 1, wherein the sampling timing reference comprises a plurality of timing references having different phases with respect to each other of the plurality of timing references.

5. The integrated circuit of claim 4, wherein the early error sample value is generated by a first one of N number of early error samplers using the variable first error threshold voltage and the late error sample value is generated by a first one of N number of late error samplers using the variable second error threshold voltage.

6. A method of providing baud-rate phase detection, comprising:

generating a first early error sample value by comparing, at a first sampling time, a data signal to a first error threshold voltage;

generating a first data sample value by comparing, at the first sampling time, the data signal to at least a first data threshold voltage;

based on the first early error sample value and the first data sample value, generating a first early error signal value;

generating a first late error sample value by comparing, at a second sampling time, the data signal to a second error threshold voltage, the second error threshold voltage not equal to the first error threshold voltage;

generating a second data sample value by comparing, at the second sampling time, the data signal to at least the first data threshold voltage;

based on the first late error sample value and the second data sample value, generating a first late error signal value; and, based on the first early error signal value and the first late error signal value, adjust a phase relationship between the data signal and a timing reference that determined the first sampling time and the second sampling time.

7. The method of claim 6, wherein the first sampling time and the second sampling time are different in time by an integer multiple of a symbol period of the data signal, the integer multiple being greater than or equal to zero.

8. The method of claim 6, wherein the first data sample value is generated by further comparing, at the first sampling time, the data signal to at least a second data threshold voltage, and wherein the second data sample value is generated by further comparing, at the second sampling time, the data signal to at least the second data threshold voltage.

9. The method of claim 6, wherein the first early error signal value is further based on a third data sample value and a fourth data sample value, and the first late error signal value is further based on a fifth data sample value and a sixth data sample value.

10. The method of claim 9, further comprising:

generating the third data sample value by comparing, at a third sampling time, the data signal to at least the first data threshold voltage, the third sampling time being a symbol period of the data signal before the first sampling time;

generating the fourth data sample value by comparing, at a fourth sampling time, the data signal to at least the first data threshold voltage, the fourth sampling time being the symbol period of the data signal after the first sampling time;

generating the fifth data sample value by comparing, at a fifth sampling time, the data signal to at least the first data threshold voltage, the fifth sampling time being the symbol period of the data signal before the second sampling time; and, generating the sixth data sample value by comparing, at a sixth sampling time, the data signal to at least the first data threshold voltage, the sixth sampling time being the symbol period of the data signal after the second sampling time.

11. The method of claim 6, further comprising:

based on the first early error signal value and the first late error signal value, adjusting, to a first phase difference value, a phase difference between the data signal and a timing reference that determined the first sampling time and the second sampling time.

12. The method of claim 11, further comprising:

while the phase difference between the data signal and the timing reference is operating at the first phase difference value, determining a first performance indicator.

13. The method of claim 12, further comprising:

based on a second early error signal value and a second late error signal value, adjusting, to a second phase difference value, the phase difference between the data signal and the timing reference;

while the phase difference between the data signal and the timing reference is operating at the second phase difference value, determining a second performance indicator; and, based on the first performance indicator and the second performance indicator, adjust at least one of the first error threshold voltage and the second error threshold voltage.

14. The method of claim 13, wherein the first performance indicator and the second performance indicator are based at least on a bit error rate of a received version of the data signal.

15. The method of claim 13, wherein the first performance indicator and the second performance indicator are based at least on a measurement of a vertical eye opening of a received version of the data signal.

16. A method of adjusting a phase difference between a data signal and a timing reference, comprising:

selecting a plurality of early threshold voltages;

successively providing a one of the plurality of early threshold voltages to an early error sampler of a baud-rate phase detector to be used as an early error sampler threshold voltage;

selecting a plurality late threshold voltages;
successively providing a one of a plurality of late threshold voltages to a late error sampler of the baud-rate phase detector to be used as a late error sampler threshold voltage;
while operating the baud-rate phase detector with respective ones of the plurality of early threshold voltages and respective ones of the plurality of late threshold voltages, determine a plurality of performance indicators that correspond to an association between the respective ones of the plurality of early threshold voltages and the respective ones of the plurality of late threshold voltages while the baud-rate phase detector is controlling the phase difference between the data signal and the timing reference; and,
based on the plurality of performance indicators, select a selected one of the plurality of early threshold voltages and select a selected one of the plurality of late threshold voltages.

17. The method of claim 16, further comprising:
provide the baud-rate phase detector with the selected one of the plurality of early threshold voltages and the selected one of the plurality of late threshold voltages.

18. The method of claim 17, wherein the data signal is a PAM-4 type signal.

* * * * *